United States Patent

Muramatsu et al.

[11] Patent Number: 5,941,512
[45] Date of Patent: Aug. 24, 1999

[54] VIBRATION DAMPER INCLUDING MASS MEMBER DISPLACEABLE BY FLUID PRESSURE CHANGE IN WORKING CHAMBER

[75] Inventors: Atsushi Muramatsu, Komaki; Masahiko Nagasawa, Kani; Yoshihiko Hagino, Komaki, all of Japan

[73] Assignee: Tokai Rubber Industries, Ltd., Japan

[21] Appl. No.: 08/982,340

[22] Filed: Dec. 2, 1997

[30] Foreign Application Priority Data

Dec. 6, 1996 [JP] Japan ................................. 8-326464

[51] Int. Cl.$^6$ .................................................. F16F 15/04
[52] U.S. Cl. ................................ 267/140.13; 267/140.14
[58] Field of Search ........................ 267/140.13, 140.11, 267/140.14, 140.15; 188/378, 379, 380

[56] References Cited

U.S. PATENT DOCUMENTS

| | | | |
|---|---|---|---|
| 4,415,148 | 11/1983 | Mair et al. ........................ | 267/140.11 |
| 4,643,405 | 2/1987 | Hoffman et al. .................. | 267/140.13 |
| 4,645,189 | 2/1987 | Quast ................................ | 267/140.13 |
| 4,721,288 | 1/1988 | Andrä et al. ...................... | 267/140.13 |
| 4,779,853 | 10/1988 | Sugino et al. .................... | 267/140.11 |
| 4,850,578 | 7/1989 | Katayama et al. ............... | 267/140.13 |
| 4,854,560 | 8/1989 | Lun .................................. | 267/140.13 |
| 5,427,362 | 6/1995 | Schilling et al. ................. | 267/140.14 |
| 5,704,596 | 1/1998 | Smith et al. ...................... | 267/140.11 |

FOREIGN PATENT DOCUMENTS 3-292219 12/1991 Japan.
6-235438 8/1994 Japan.

OTHER PUBLICATIONS

SAE Technical Paper Series 932,897 Oct. 25–27, 1993 by Gun Kim & Rajendra Singh.

*Primary Examiner*—Matthew C. Graham
*Attorney, Agent, or Firm*—Parkhurst & Wendel, L.L.P.

[57] ABSTRACT

A vibration damper including (a) an attaching member fixed to a subject member whose vibrations are damped by the vibration damping device, (b) a mass member displaceable relative to the attaching member in a vibration input direction, (c) an elastic connector elastically connecting the mass member to the attaching member and cooperating with the mass member to at least partially define a working chamber, and (d) a structure for defining a fluid passage communicating with the working chamber for changing a pressure of a fluid in the working chamber to thereby cause the mass member to be displaced relative to the attaching member in the vibration input direction.

13 Claims, 5 Drawing Sheets

VIBRATION DAMPER INCLUDING MASS MEMBER DISPLACEABLE BY FLUID PRESSURE CHANGE IN WORKING CHAMBER

BACKGROUND OF THE INVENTION

1. Field of the Invention

The present invention relates in general to a vibration damper attached to a subject member to damp vibrations of the subject member, and more particularly to such a vibration damper of active control type adapted to actively or positively damp the vibrations.

1. Discussion of the Related Art

A dynamic damper is widely known as means for damping vibrations of a subject member which is likely to be vibrated, such as a body of an automotive vehicle. Recently, there have been proposed vibration dampers of active control type adapted to positively damp or control the vibrations of the subject member by applying oscillations to the subject member, in an attempt to obtain an enhanced damping effect. Examples of such active control type vibration dampers are disclosed in JP-A-3-292219 and JP-A-6-235438, wherein a mass member is connected through a spring member to an attaching member attached to the subject member, so that the mass member, spring member and attaching member cooperate to constitute a vibration system. The vibration dampers disclosed in these publications include an electromagnetic drive mechanism for applying an oscillating force to the mass member of the vibration system to thereby apply a large oscillating force to the subject member through the vibration system.

However, such conventional vibration dampers suffer from an inevitable increase in the size and weight, due to the provision of the electromagnetic drive mechanism.

The electromagnetic drive mechanism not only requires a coil and a magnet, but also suffers from problems of complicated construction and difficult and costly manufacture, due to a need of positioning those coil and magnet with high accuracy in order to assure high stability of the drive force generated.

Further, the conventional vibration dampers using the electromagnetic drive mechanism are not satisfactory in the operating reliability and durability due to the complicated construction, and tend to have difficulty in dealing with any defects which may take place.

SUMMARY OF THE INVENTION

It is therefore a first object of the present invention to provide a small-sized, light-weight vibration damper which is simple in construction with a reduced number of components and which includes an oscillating mechanism capable of applying an effective oscillating force to the mass member of the vibration system.

It is a second object of the present invention to provide a vibration damping device which is simple in construction with a reduced number of components and which is capable of effectively damping or controlling vibrations received in different directions.

The object indicated above may be achieved according to one aspect of this invention, which provides a vibration damper comprising: (a) an attaching member fixed to a subject member whose vibrations are damped by the vibration damper; (b) a mass member disposed such that the mass member is displaceable relative to the attaching member in a vibration input direction in which the vibrations are received; (c) an elastic connector elastically connecting the mass member to the attaching member, the mass member and the elastic connector at least partially defining a working chamber; and (d) means for defining a fluid passage communicating with the working chamber of the each vibration damper for changing a pressure of a fluid in the working chamber to thereby cause the mass member to be displaced relative to the attaching member in the vibration input direction.

In the vibration damper constructed according to the present invention, the mass member is elastically connected to and supported by the attaching member through the elastic connector, and the mass member and the elastic connector constitute a vibration system. The mass member of this vibration system is displaced or oscillated in the vibration input direction by a periodic change of the pressure of the fluid in the working chamber, which periodic change is effected by changing the pressure of the fluid supplied to the working chamber through the fluid passage.

The vibration damper of the present invention does not incorporate any actuator means for oscillating the mass member, but has a simple structure defining the working chamber communicating with an external fluid pressure source. Accordingly, the vibration damper is simplified in construction with a reduced number of components, and therefore simplifies the construction of a vibration damping device of active control type capable of exhibiting a high vibration damping effect.

The reduced number of the components of the vibration damper reduces the required positional and dimensional accuracy of the components, facilitating the manufacture of the vibration damper, leading to reduced cost of manufacture of the vibration damper.

The elastic connector may be an elastic body formed of a suitable rubber material. The fluid used is preferably an air whose pressure is suitably controlled to change between two different levels. These two levels may be both lower than the atmospheric pressure, or both higher than the atmospheric pressure. Alternatively, the two levels may be one of the following combinations: a negative or reduced pressure and the atmospheric pressure; a negative or reduced pressure and a positive pressure; and the atmospheric pressure and a positive pressure.

The fluid passage is preferably formed through a member which is fixed to the subject member to be damped. For instance, the fluid passage is preferably formed through the attaching member. In this case, the attaching member serves as the means for defining the fluid passage.

In one preferred form of this invention, the vibration damper further comprises guiding means for guiding the mass member to be displaced relative to the attaching member in the vibration input direction, so as to prevent relative displacement of the mass member and the attaching member in a direction perpendicular to the vibration input direction. In this form of the vibration damper, the mass member is prevented by the guiding means from being displaced in a direction other than the vibration input direction. The guiding means permits intended oscillation of the mass member relative to the attaching member in the vibration input direction, assuring easier and more accurate control of the oscillation of the mass member.

The guiding means may include a guide rod which extends from one of the attaching member and the mass member in the vibration input direction and which engages a guide hole formed in the other of the attaching and mass members.

In one advantageous arrangement of the above preferred form of the invention, the attaching member includes the guide rod while the mass member has the guide hole, and the attaching member further includes an attaching portion at which the attaching member is fixed to the subject member. In this arrangement, the elastic connector extends from the attaching portion of the attaching member in a direction substantially perpendicular to the vibration input direction, and the mass member is spaced apart from the attaching portion of the attaching member in the vibration input direction and secured to a radially outer portion of the elastic connector such that the working chamber at least partially defined by the elastic connector and the mass member is located between the attaching portion and the mass member. The guide rod of the attaching member extends through the working chamber into the guide hole of the mass member.

In another preferred form of this invention, the fluid passage is connected at one of opposite ends thereof to an external air pressure source, and the working chamber consists of a single air chamber which is at least partially defined by the elastic connector and the mass member and which communicates with the other of the opposite ends of the fluid passage.

The above form of the vibration damper has a single air chamber connected to the external air pressure source through the fluid passage is extremely simple in construction and considerably easy to manufacture. Accordingly, the vibration damper is further simplified and can be manufactured at a reduced cost.

In a further preferred form of this invention, the fluid passage is connected at one of opposite ends thereof to an external air pressure source, and the vibration damper further comprises a flexible diaphragm which fluid-tightly divides the working chamber in a liquid chamber filled with a non-compressible fluid on one side of the flexible diaphragm, and an air chamber on the other side of the flexible diaphragm. The air chamber communicates with the other of the opposite ends of the fluid passage.

In the above form of the vibration damper wherein the working chamber consists of the air chamber and the liquid chamber, the volume of the air chamber can be made small, thereby making it possible to improve a displacement response of the mass member to the change of the air pressure.

In one advantageous arrangement of the above preferred form of the vibration damper, the liquid chamber is defined by the flexible diaphragm, the elastic connector and the mass member, and an area of a surface of the flexible diaphragm which partially defines the air chamber is different from a total area of surfaces of the elastic connector and the mass member which partially define the liquid chamber.

In the above advantageous arrangement, the air pressure in the air chamber is applied through the flexible diaphragm to the liquid chamber, and the liquid pressure in the liquid chamber is applied partly directly to the mass member and partly indirectly through the elastic connector to the mass member. The difference or ratio of the surface area of the flexible diaphragm and the total surface area of the elastic connector and the mass member is suitably selected so as to permit the mass member to be oscillated over a suitable distance with a suitable force due to the application of the air pressure from the air chamber to the mass member through the liquid in the liquid chamber.

Where the total surface area of the elastic connector and the mass member is smaller than the surface area of the flexible diaphragm, the oscillation distance of the mass member can be made relatively large. Where the total surface area of the elastic connector and the mass member is larger than the surface area of the flexible diaphragm, the force for oscillating the mass member can be effectively obtained.

In a yet further preferred form of the present invention, the working chamber consists of two air chambers formed on opposite sides of the mass member which are opposed to each other in the vibration input direction. In this case, the two air chambers are connected to respective two mutually independent air passages connected to an external air pressure source so that air pressures in the two air chambers are periodically changed.

In the above preferred form of the vibration damper, both of the air chambers function to oscillate the mass member, capable of providing a relatively large force for oscillating the mass member.

In the above vibration damper, the mass member may be oscillated as needed, even where only a reduced or negative pressure or only a positive pressure is used. That is, the negative or positive pressure is applied alternately to the two air chambers on the opposite sides of the mass member to oscillate the mass member.

The oscillation of the mass member may be suitably adjusted by adjusting the air pressures to be applied to the two air chambers.

In one advantageous arrangement of the above preferred form of the vibration damper having the two air chambers, the two air passages are connected to the external air pressure source through respective two switch valves which are controlled to periodically change the air pressures in the two air chambers, in synchronization of a frequency of the vibrations of the subject member to be damped, and such that the air pressure in one of the two air chambers is lowered while the air pressure in the other of the two air chambers is raised.

In the above vibration damper, the air pressures in the two air chambers on the opposite sides of the mass member are controlled such that a phase of the pressure change in one of the two air chambers is different by 180° from that of the pressure change in the other air chamber, so that the pressures in the two air chambers cooperate to oscillate the mass member. The air pressures in the air chambers may change along sinusoidal curves having a phase difference of 180°.

In a still further preferred form of the present invention, the air passage is connected to an external air pressure source through a switch valve which is controlled to periodically changing an air pressure to be applied to the working chamber through the fluid passage, in synchronization with a frequency of the vibrations of the subject member to be damped. In this case, the vibrations of the subject member can be effectively damped by actively controlling the switch valve.

The second object indicated above may be achieved according to a second aspect of this invention, which provides a vibration damping device comprising a plurality of vibration dampers each constructed according to the first aspect of the invention discussed above, and a bracket which supports the plurality of vibration dampers such that directions of displacement of the mass members of the vibration dampers relative to the attaching members are different from each other.

The vibration damping device according to the second aspect of the invention is capable of damping or controlling vibrations of the subject member received in different direction, by the oscillating displacements of the the mass members of the two or more vibration dampers. For example, the plurality of vibration dampers consist of two or three vibration dampers which are attached to the bracket such that the directions of displacement of the mass members of these vibration dampers are mutually perpendicular to each other.

BRIEF DESCRIPTION OF THE DRAWINGS

The above and optional objects, features, advantages and technical and industrial significance of the present application will be better understood by reading the following detailed description of presently preferred embodiments of the invention, when considered in connection with the accompanying drawings, in which.

DETAILED DESCRIPTION OF THE PREFERRED EMBODIMENTS

Figure 1:
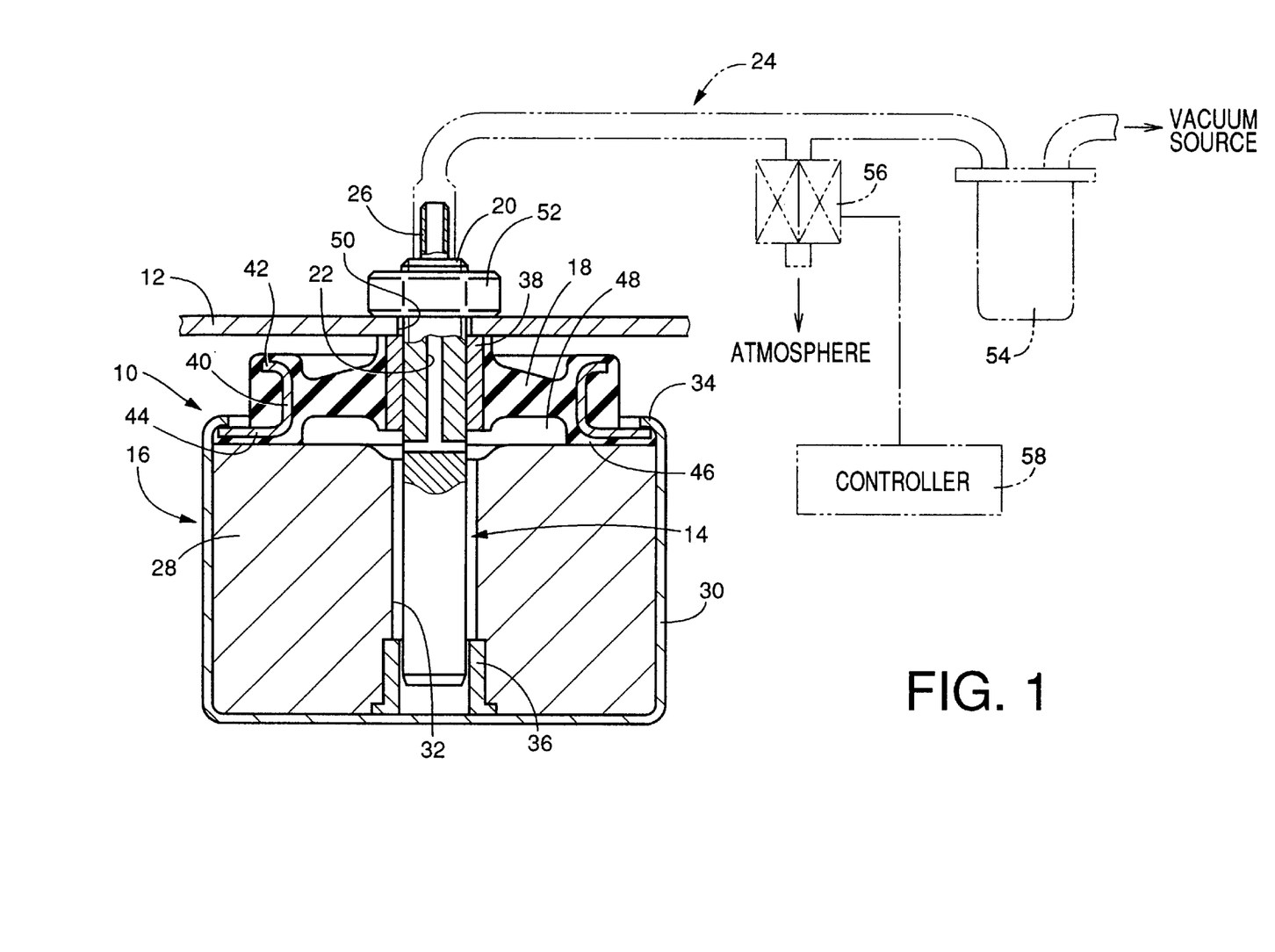
FIG. 1 is an elevational view in cross section of a vibration damper including a vibration damper constructed according to a first embodiment of this invention.

Referring first to FIG. 1, there is shown a vibration damper 10 constructed according to a first embodiment of the present invention. This vibration damper 10 includes an attaching member 14, at which the damper 10 is attached to a subject member or vibrating member 12 to damp its vibrations. To the attaching member 14, there is elastically connected a mass member 16 through an elastic connector in the form of an elastic body 18. The attaching member 14, mass member 16 and elastic body 18 cooperate to constitute a vibration system in which the mass member 16 serves as a mass while the elastic body 18 serves as a spring. The vibration damper 10 is adapted to actively damp the vibrations of the vibrating member 12 by applying an oscillating force of the vibration system to the vibrating member 12 through the attaching member 14. The vibration damper 10 of the present embodiment is constructed to provide an intended damping effect with respect to vibrations of the vibrating member 12 received in the vertical direction as seen in FIG. 1. This direction will be referred to as "vibration input direction", where appropriate.

Described in detail, the attaching member 14 takes the form of a rod having a circular cross sectional shape and a relatively small diameter. The attaching member 14 includes a threaded axially upper end portion 20 (as seen in FIG. 1) which functions as a bolt. The attaching member 14 has an air passage 22 formed through the threaded axially upper end portion 20 so as to extend down to an axially intermediate position over a predetermined length in the axial direction, namely, in the vibration input direction. The air passage 22 is open, at its end remote from the end of the upper end portion 20, in the circumferential surface of the attaching member 14. The attaching member 14 has an integrally formed nipple 26 extending axially upwardly from the end face of the threaded upper end portion 20. An air conduit 24 is connected to this nipple 26, for communication with the air passage 22.

The mass member 16 includes a circular disc-like body 28 formed of a ferrous or other metallic material having a relatively large specific gravity, and a thin-walled cylindrical covering 30 formed of a metallic material. The cylindrical covering 30 is closed at one axial end thereof, and is open at the other axial end. The body 28 is inserted into the covering 30 through its open axial end, and is fixed within the covering 30. The body 28 has a guide hole 32 formed therethrough along its axis over the entire axial length. One of the axially opposite open ends of the guide hole 32 is closed by the bottom wall of the cylindrical covering 30 in which the body 28 is accommodated. The open end portion of the covering 30 serves as a calked portion 34 extending axially outwardly from the corresponding end face of the body 28.

The axially lower portion of the attaching member 14 remote from the threaded axially upper end portion 20 is inserted into the guide hole 32 of the mass member 16, whereby the mass member 16 is disposed coaxially with the attaching member 14. This axially lower portion of the attaching member 14 is considered to be a guide rod, while the threaded axially upper end portion 20 is considered to be an attaching portion. The guide hole 32 has a diameter which is slightly larger than the outside diameter of the attaching member 14, so that there exists a certain amount of clearance between the inner surface of the guide hole 32 and the outer circumferential surface of the attaching member 14. This arrangement permits relative movement of the mass member 16 and the attaching member 14.

The mass member 16 further includes a guide sleeve 36 fixedly received in the lower end portion of the guide hole 32 closed by the covering 30. The lower end portion of the attaching member 14 is axially slidably guided by this guide sleeve 36, with a small amount of friction therebetween, so as to reduce or prevent abutting contact of the lower end portion of the attaching member 14 with the inner surface of the body 28, which would take place due to relative displacement between the attaching member 14 and the mass member 16 in the radial direction.

The elastic body 18 elastically connecting the attaching member 14 and the mass member 16 is a generally ring-like or annular member having a relatively small thickness or axial dimension. A metal sleeve 38 and a connecting metal member 40 are bonded to the inner circumferential surface and the radially outer portion of the elastic body 18, in the process of vulcanization of a rubber material to form the elastic body 18. The metal sleeve 38 is fixedly fitted on a relatively upper portion of the attaching member 14, so that the elastic body 18 is secured to the attaching member 14 such that the elastic body 18 extends radially outwardly of the attaching member 14. The metal sleeve 38 is positioned relative to the attaching member 14 such that the lower end of the metal sleeve 38 is spaced apart from the axially inner open end of the air passage 22 remote from the threaded axially upper end portion 20, so as to prevent the metal sleeve 38 from closing the openings of the air passage 22 in the outer circumferential surface of the attaching member 14. The metal sleeve 38 is fitted on the attaching member 14 so as to assure a sufficient degree of fluid tightness therebetween.

The connecting metal member 40 is a generally cylindrical member having upper and lower flanges 42, 44 integrally formed so as to extend radially outwardly at the respective axially opposite ends. The connecting metal member 40 is almost entirely embedded in the radially outer portion of the elastic body 18, such that only the end portion of the lower flange 44 is exposed, projecting radially outwardly from the outer circumferential surface of the elastic body 18. The mass member 16 is secured to the elastic body 18, with the calked portion 34 of the covering 30 being calked against the exposed end portion of the lower flange 44 of the connecting metal member 40 such that the lower flange 44 is sandwiched by and between the calked portion 34 and the upper end face of the body 28, with a sealing rubber layer 46 interposed between the lower flange 44 and the body 28 to assure fluid tightness therebetween.

Thus, the mass member 16 is elastically connected to and supported by the attaching member 14 through the elastic body 18 such that the elastic body 18 is fixed at its inner circumference to the attaching member 14 and at its radially outer portion to the mass member 16. Further, the attaching member 14, mass member 16 and elastic body 18 cooperate to define a working chamber in the form of an air chamber 48 communicating with the air passage 22 and the annular clearance between the attaching member 14 and the body 28 of the mass member 16. The air chamber 48 may be considered to include the above-indicated annular clearance.

The vibrating member 12 to be damped by the present vibration damper 10 has a fixing hole 50 for installation of the vibration damper 10. Namely, the attaching member 14 extends through the fixing hole 50 such that the threaded axially upper end portion 20 is located above the vibrating member 12. A nut 52 is screwed on the thread formed on the upper end portion 30 so that the vibrating member 12 is held between the nut 52 and the metal sleeve 38 fixed to the attaching member 14. Thus, the vibration damper 10 is attached to the vibrating member 12 with the attaching member 14 being bolted to the vibrating member 12. In the present embodiment wherein the mass member 16 is displaceable relative to the attaching member 14 in the vibration input direction, namely, in the axial direction of the attaching member 14, the vibrations of the vibrating member 12 in the axial direction of the attaching member 14 can be effectively damped by the vibration damper 10.

The air conduit 24 which is connected at one end thereof to the nipple 26 communicating with the air chamber 48 through the air passage 22 is connected at the other end to a vacuum tank 54, which in turn is connected to a suitable vacuum source such as a vacuum pump or an intake system of an internal combustion engine. The air conduit 24 is also connected to a switch valve 56, between the nipple 26 and the vacuum tank 54. The switch valve 56 has an open position for communication of the air conduit 24 with the atmosphere, and a closed position in which the air conduit 24 is disconnected from the atmosphere. The switch valve 56 is controlled by a controller 58. With the switch valve 56 being selectively operated to the closed and open positions, the air chamber 48 is selectively communicated with the vacuum tank 54 and the atmosphere. That is, the pressure in the air chamber 48 can be changed between the atmospheric pressure and a reduced pressure lower than the atmospheric pressure. The switch valve 56 is preferably a solenoid-operated valve that can be switched at a relatively high speed between the closed and open positions.

The conduit 24, vacuum tank 54 and switch valve 56 cooperate with the vibration damper 10 to constitute a vibration damping device, wherein the switch valve 56 is suitably controlled to alternately apply the reduced pressure and the atmospheric pressure to the air chamber 48, so that the mass member 16 is subject to an oscillating force generated as a result of a periodic change of the pressure in the air chamber 48, such that the oscillating force acts on the mass member 16 alternately in the opposite axial directions of the attaching member 14, whereby the mass member 16 is oscillated relative to the attaching member 14 in the axial directions. In this respect, it is noted that the elastic body 18 fixed to the attaching member 14 through the metal sleeve 38 is elastically deformed upon application of the reduced pressure to the air chamber 48 partially defined by the elastic body 18, so that the mass member 16 fixed to the elastic body 18 is axially moved relative to the attaching member 14 in the direction toward the vibrating member 12.

The mass member 16 is displaced relative to the attaching member 14 in the opposite axial directions, at the operating frequency of the switch valve 56, that is, at the frequency at which the switch valve 56 is switched between the closed and open positions according to a control command from the controller 58. Accordingly, the vibration system consisting of the mass member 16 and the elastic body 18 can be oscillated at a desired frequency by suitably adjusting the operating frequency of the switch valve 56. Further, the amplitude of the oscillation of the vibration system 16, 18 can be changed by adjusting the level of the reduced pressure applied to the air chamber 48, i.e., the pressure in the vacuum tank 54.

To effectively damp the vibrations of the vibrating member 12, the reduced pressure generated by the vacuum pressure source and stored in the air tank 54 is adjusted depending upon the amplitude of the vibrations of the vibrating member 12, and the operating frequency of the switch valve 56 is controlled by the controller 58 depending upon the frequency of the vibrations, so that the vibration system consisting of the mass member 16 and the elastic body 18 is oscillated to apply a suitable oscillating force to the vibrating member 12 so as to effectively damp or control the vibrations of the vibrating member 12. Where the vibration system 16, 18 is oscillated at its resonance frequency or a frequency close to the resonance frequency, a relatively large oscillating force can be efficiently applied to the vibrating member 12, whereby the damping effect exhibited by the vibration damping device can be further improved.

It is also noted that the vibration damper 10 which does not incorporate therein an electromagnetic or other type of actuator for generating an oscillating force is simplified in construction with reduced weight and size, and is economical to manufacture. Further, the simple construction results in an increase in the operating reliability and durability of the vibration damper 10, and facilitate its maintenance for intended performance.

Where the present vibration damping device is used on a motor vehicle having an internal combustion engine, the reduced pressure in the intake system of the engine can be effectively utilized by the vibration damper 10 to oscillate the mass member 16. In this case, the vibration damper 10 does not require any means exclusively used for generating an energy for oscillating the mass member 16, namely, for generating the reduced pressure. Where the damping device is used in an environment in which compressed air is readily available, the reduced or negative pressure may be replaced by a positive pressure of such compressed air, to oscillate the mass member 16.

Figure 2:
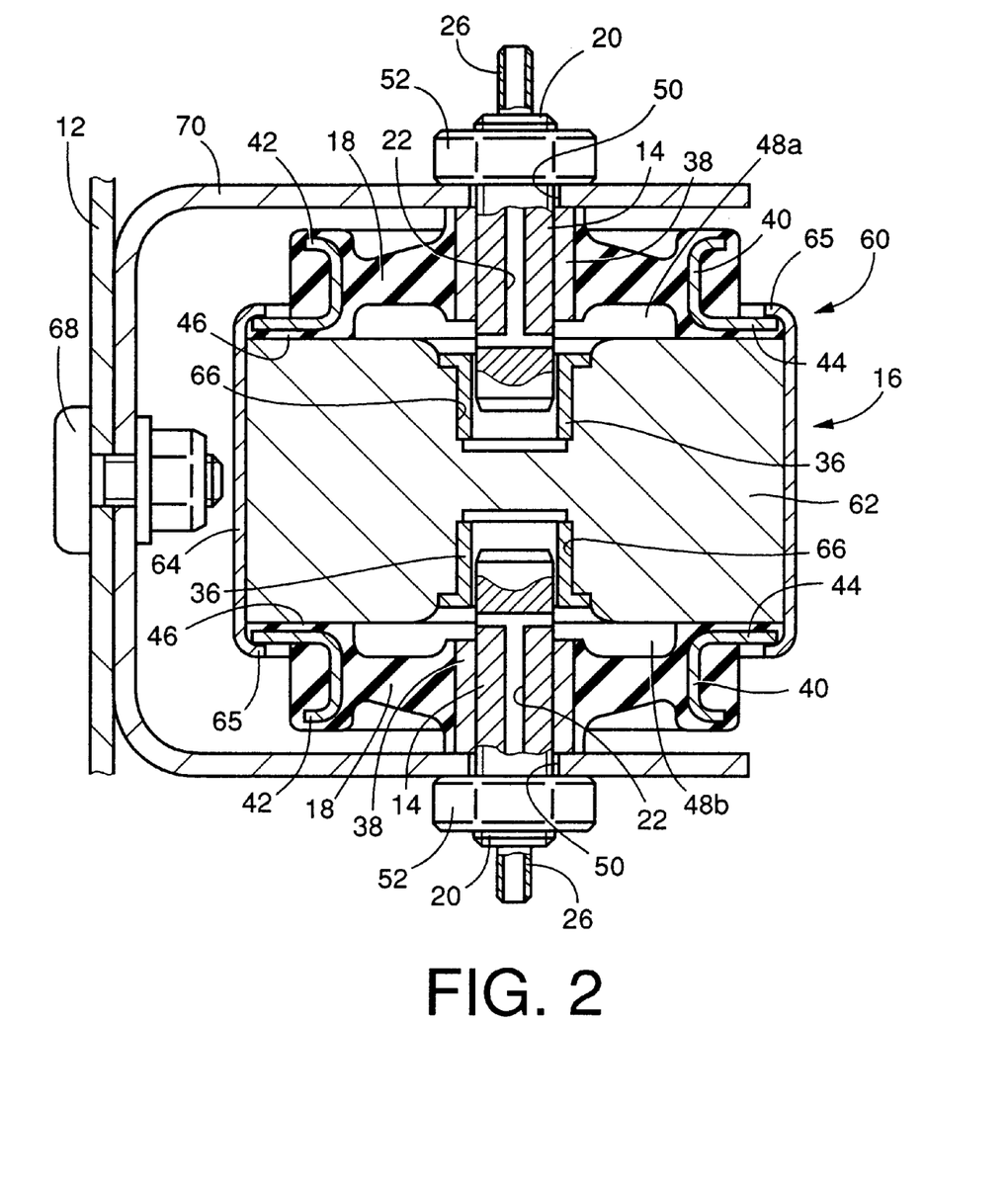
FIG. 2 is an elevational view in cross section of a vibration damper according to a second embodiment of the invention.

Referring next to FIG. 2, a vibration damper 60 according to a second embodiment of this invention will be described. The same reference signs as used in FIG. 1 will be used in FIG. 2 to identify the functionally corresponding elements, and redundant description of these elements will not be provided.

In the vibration damper 60, the mass member 16 includes a circular disc-like body 62 having a relatively large thickness, and a thin-walled cylindrical covering 64 in which the body 62 is fixedly accommodated. Two attaching members 14, 14 are disposed on the respective axially opposite sides of the mass member 16, such that the mass member 16 is elastically connected to the attaching members 14, 14 through two respective elastic bodies 18, 18. The mass member 16 is fixed to the radially outer portion of each elastic body 18 such that the radially outer portion of the lower flange 44 of the cylindrical connecting metal member 40 bonded to the radially outer portion of the elastic body 18 is held between the corresponding end face of the body 62 and a calked portion 65 formed at the corresponding open end of the covering 64.

The body 62 of the mass member 16 has two guide holes 66, 66 open in its axially opposite end faces. Each guide hole 66 has a length not larger than a half of the axial dimension of the body 62. A guide sleeve 36 is fixedly accommodated in each of the two guide holes 66, so that the attaching members 14, 14 partially inserted in the guide holes 66 are guided by the guide sleeves 36, so as to permit the mass member 16 (body 62) to be displaced relative to the attaching members 14 in the axial direction, that is, in the vibration input direction.

The vibration damper 60 is fixed to the vibrating member 12 through a generally U-shaped bracket 70 secured to the vibrating member 12 by bolts 68, as shown in FIG. 2, by attaching the attaching members 14, 14 to the bracket 70 such that the axes of the attaching members 14, 14 are aligned with each other in the vibration input direction in which the vibrations of the vibrating member 12 are applied to the vibration damper 60.

In the present vibration damper 60, two air chambers 48a, 48b are formed on the axially opposite sides of the mass member 16. Each air chamber 48 is defined by the corresponding elastic body 18 and attaching member 14 and the corresponding end face of the body 62. The air conduit 24 shown in FIG. 1 is connected to the nipple 26 of each of the attaching members 14, so that the pressures in the air chambers 48a, 48b can be changed independently of each other by the two switch valves 56 controlled by the controller 58.

In the vibration damper 60 of FIG. 2, the mass member 16 is oscillated by the periodic pressure changes in the two air chambers 48a, 48b, so as to apply an effective oscillating force to the vibrating member 12. Thus, the vibration damper 60 has substantially the same advantages as the vibration damper 10 of the first embodiment.

It is noted that the direction of displacement of the mass member 16 by application of the reduced pressure to the air chamber 48a is opposite to that by application of the reduced pressure to the air chamber 48b. This is also true where the positive pressure is applied to the air chambers 48a, 48b. Although the reduced and positive pressures are simultaneously applied to one and the other of the two air chambers 48a, 48b, only the reduced pressure or the positive pressure may be alternately applied to the two air chambers 48a, 48b. In this case, too, the mass member 16 can be effectively oscillated in the opposite directions, with high accuracy of control of the oscillation.

Where the reduced and positive pressures are simultaneously applied to one and the other of the two air chambers 48a, 48b such that the reduced and positive pressures are alternately applied to each of the chambers 48a, 48b, the oscillating force applied to the mass member 16 can be increased without an increase in the volume of each air chamber 48a, 48b, that is, while maintaining a high response of the displacement of the mass member 16 to the pressure changes in the air chambers 48.

Figure 3:
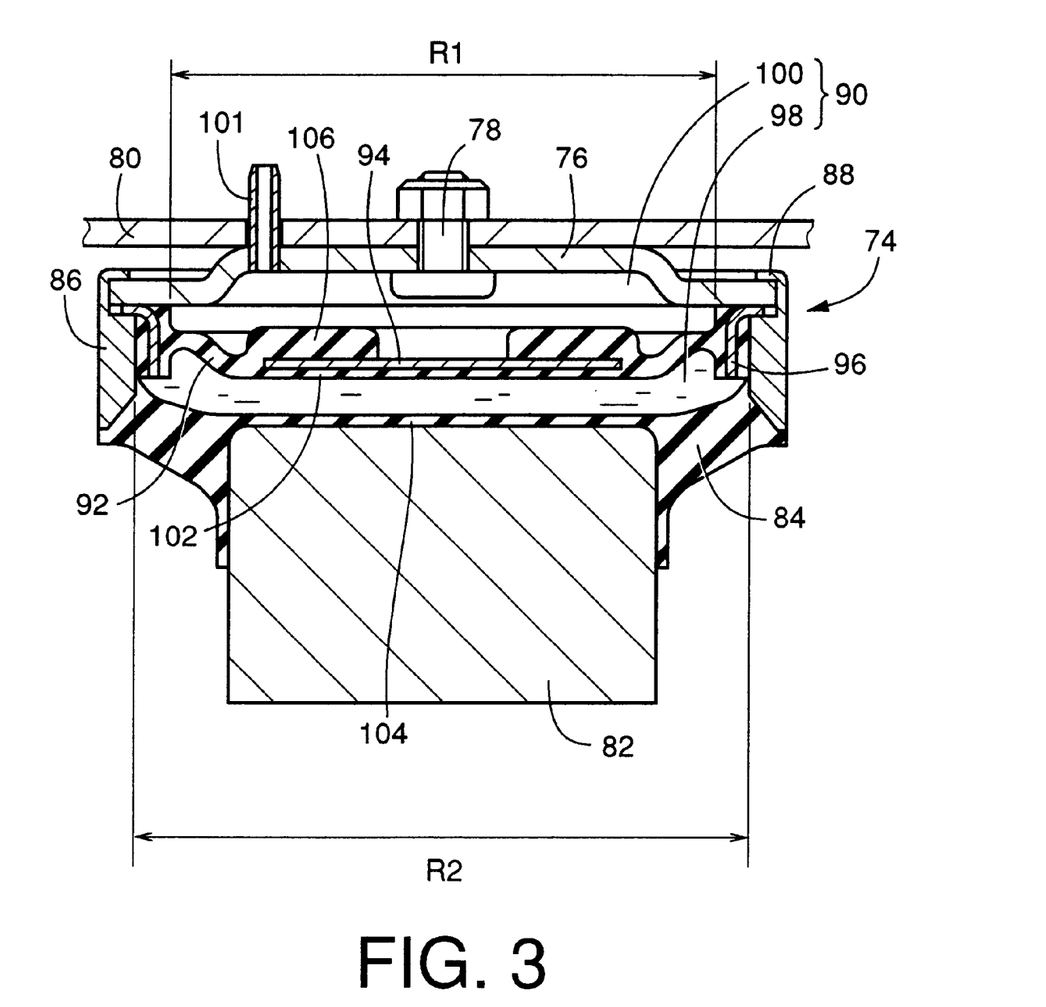
FIG. 3 is an elevational view in cross section of a vibration damper according to a third embodiment of the invention.

A vibration damper 74 according to a third embodiment of this invention is shown in FIG. 3. In the following description by reference to FIG. 3, various terms such as "lower surface" and "axially upward direction", which relate to the vertical direction should be interpreted in relation to the vertical direction as seen in FIG. 3.

The vibration damper 74 includes an attaching member 76 in the form of an inverted dish, which is superposed at a bottom portion thereof on the lower surface of a vibrating member 80. The attaching member 76 is fixed to the vibrating member 80 by a fixing bolt 78, which extends from a central portion of the bottom wall of the attaching member 76, through the vibrating member 80 in the axially upward direction.

The vibration damper 74 further includes a circular disk-like mass member 82 made of a metallic material, and an elastic connector in the form of a generally annular elastic body 84 which is bonded at its inner circumferential surface to the axially upper portion of the mass member 82 in the process of vulcanization of a rubber material to form the elastic body 84, such that the annular elastic body 84 extends a substantially radially outward direction from the outer circumferential surface of the mass member 82. The elastic body 84 is bonded at its outer circumferential surface to a cylindrical connecting metal member 86 which is disposed radially outwardly of the mass member 82 with a predetermined radial spacing such that the connecting metal member 86 is coaxially with the mass member 82 and is slightly offset from the mass member 82 in the axially upward direction. The connecting metal member 86 is bonded at its lower end portion to the elastic body 84, and has an integrally formed calked upper end portion 88.

The attaching member 76 and the mass member 82 are spaced apart from each other by a predetermined distance in the axial or vertical direction such that these members 76, 82 are opposed to each other in the axial direction. The calked upper end portion 88 of the connecting metal member 86 is calked against the radially outer portion of the attaching member 76, whereby the mass member 82 is elastically connected to the attaching member 76 through the elastic body 84. In the present arrangement, there is formed a working chamber 90 between the attaching member 76 and the mass member 82, such that the working chamber 90 is partially defined by the elastic body 84.

The working chamber 90 is fluid-tightly divided by a flexible diaphragm in the form of a rubber member 92, into a liquid chamber 98 between the rubber member 92 and the mass member 82, and an air chamber 100 between the rubber member 92 and the attaching member 76. The rubber member 92 is a thin-walled circular plate formed of a rubber material. A relatively thin circular restricting plate 94 formed of a metallic or other hard material is bonded to a central portion of the rubber member 92. A cylindrical supporting metal member 96 is bonded to the outer periphery of the rubber member 92 in the process of vulcanization of the rubber material of the rubber member 92. The upper end portion of the supporting metal member 96 is held between the attaching member 76 and the connecting metal member 86, with the calked portion 88 calked against the attaching member 76 as described above. Thus, the rubber member 92 is fixed to the connecting metal member 86, such that the rubber member 92 is disposed intermediate between the attaching member 76 and the mass member 82. The liquid chamber 98 is filled with a non-compressible fluid such as water or alkylene glycol.

The air chamber 100 is connected through a tube 101 to a suitable vacuum pressure source as shown in FIG. 1, or to a suitable compressed air source, so that the pressure in the air chamber 100 is periodically changed.

In the present vibrating damper 74 constructed as described above, alternate application of a reduced pressure and the atmospheric pressure to the air chamber 100 at a suitable frequency, for example, will cause elastic deformation and displacement of the rubber member 92 based on a periodic pressure change in the air chamber 100, which in turn causes a periodic pressure change in the liquid chamber 98, so that the mass member 82 is displaced in the opposite axial directions toward and away from the attaching member, that is, the mass member 82 is oscillated in the axial direction at a frequency corresponding to the frequency of the alternate application of the reduced and atmospheric pressures, namely, the operating frequency of the switch 56 controlled by the controller 58, as shown in FIG. 1.

With the mass member 82 being oscillated as described above, an oscillating force is applied to the vibrating member 80 so as to damp or control the vibrations of the vibrating member 80, as in the first embodiment.

In the present vibration damper 74 wherein the working chamber 90 consists of the liquid chamber 98 and the air chamber 100, the volume of the air chamber 100 can be minimized while assuring the volume of the working chamber 90 necessary to obtain permissible amounts of displacement of the mass member 82 and elastic body 84, so that the response of the displacement of the mass member 82 and the response of the oscillating force applied to the vibration member 80 are improved with respect to the pressure change in the air chamber 100.

It is also noted that an effective diameter R2 of the elastic body 84 through which the pressure is applied from the liquid chamber 98 to the mass member 82 is larger than a diameter R1 of the rubber member 92 through which the pressure is applied from the air chamber 100 to the liquid chamber 98, so that the air pressure in the air chamber 100 is effectively applied to the liquid chamber 98 and to the mass member 82 and the elastic body 84, permitting improved stability of oscillation of the mass member 82.

The restricting plate 94 prevents local deformation of the central portion of the rubber member 92, permitting effective pressure application between the air and liquid chambers 100, 98, and minimizing possible local abutting contact of the rubber member 92 with the attaching member 76 and the mass member 82, leading to increased durability of the rubber member 92. Further, the opposed surfaces of the restricting plate 94 and the mass member 82 are covered by respective thin-walled rubber layers 102, 104, and an annular rubber buffer 106 is provided on the other surface of the restricting plate 94 which faces the attaching member 76. These rubber layers 102, 104 and buffer 106 are effective to prevent or minimize noise and shock upon abutting contact of the restricting plate 94 with the attaching member 76 and the mass member 82.

Figure 4:
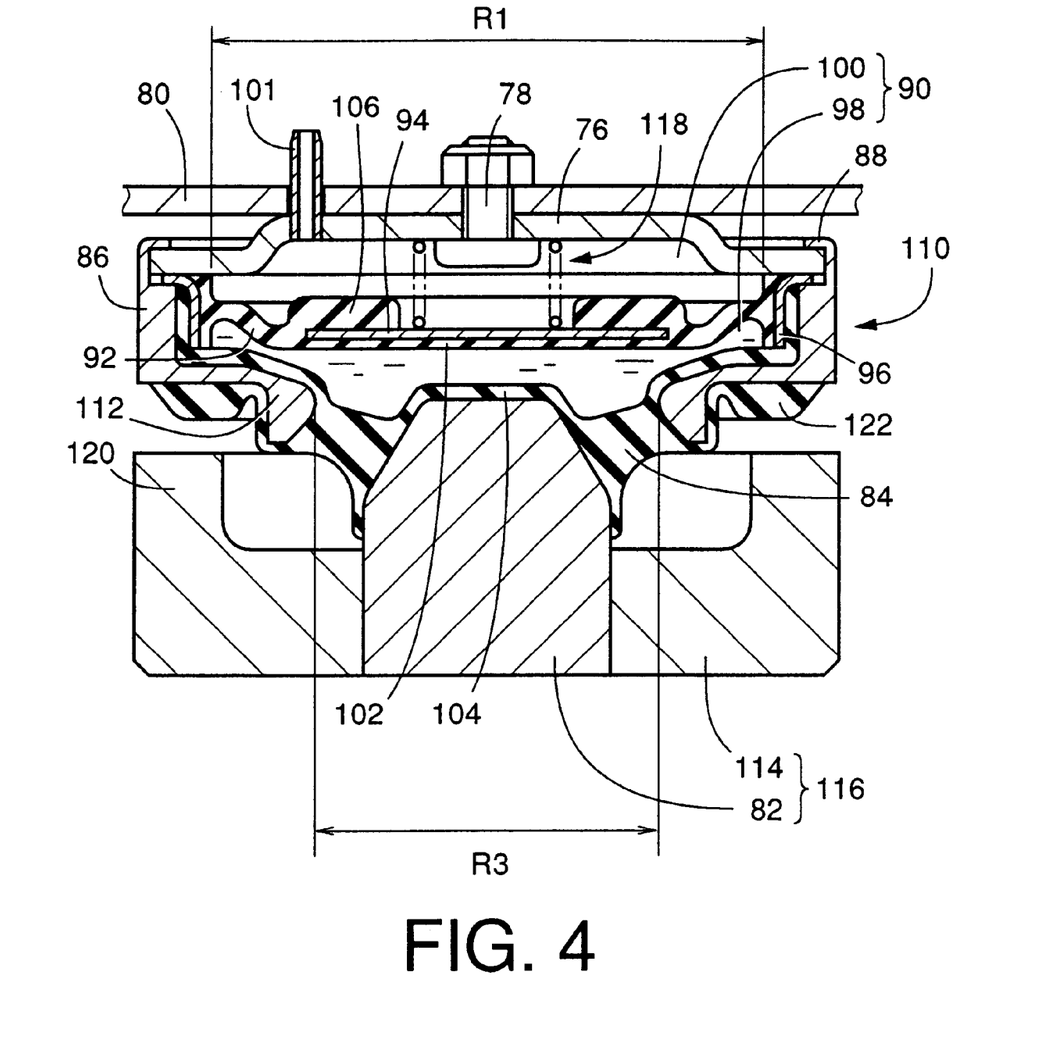
FIG. 4 is an elevational view in cross section of a vibration damper according to a fourth embodiment of the invention.

Reference is now made to FIG. 4 showing a vibration damper 110 according to a fourth embodiment of this invention. The same reference signs as used in FIG. 3 will be used in FIG. 4 to identify the functionally corresponding elements, and redundant description of these elements will not be provided.

IN the vibration damper 110 of FIG. 4, the cylindrical connecting metal member 86 has an annular support portion 112 integrally formed at its lower end so as to extend in the radially inward direction. The elastic body 84 is interposed between the inner circumference of the annular support portion 112 and the mass member 82. The elastic body 84 is a generally cylindrical member whose diameter is smaller than the inside diameter of the annular support portion 112 of the connecting metal member 86. The mass member 82 is bonded at its upper end portion to the elastic body 84 and is fixed at its lower end portion to an annular auxiliary mass member 114 having a relatively large axial dimension or wall thickness. The auxiliary mass member 114 is fixedly fitted on the mass member 82, and cooperates with the mass member 82 to constitute a mass structure 116.

In the present vibration damper 110, the elastic body 84 has a relatively small effective outside diameter R3 in the presence of the annular support portion 112, so that the diameter R3 is smaller than the diameter R1 of the rubber member 92 through which the pressure is applied from the air chamber 100 to the liquid chamber 98.

In the present vibration damper 110, the air pressure change in the air chamber 100 causes bidirectional axial displacement of the mass structure 116 through the liquid chamber 98, as in the third embodiment of FIG. 3. Since the effective diameter R3 of the elastic body 84 is smaller than the diameter of the rubber member 92, the amount of the axial displacement of the mass member 82 is larger than the amount of displacement of the rubber member 92 based on the pressure change in the air chamber 100, making it possible to increase the amount of displacement of the mass structure 116 per unit volume of the air flow into and from the air chamber 100.

The vibration damper 110 uses a coil spring 118 disposed in the air chamber 100, between the attaching member 76 and the restricting plate 94, so as to bias the restricting plate 94 in the direction away from the attaching member 76. The provision of the coil spring 118 is effective to increase the stability of the attitude of the restricting plate 94 and the attitude of the rubber member 92. The coil spring 118 is also effective to permit the rubber member 92 to maintain a sufficient degree of elasticity for a prolonged period of time. That is, when the pressure in the air chamber 100 is changed from the reduced pressure to the atmospheric pressure, the rubber member 92 is returned from the upper position to the original position by not only its own elasticity but also the biasing force of the coil spring 118. Accordingly, the coil spring 118 reduces the fatigue of the rubber member 92 to be caused by the alternate application of the reduced and atmospheric pressures to the air chamber 100, and prevents early deterioration or variation of the oscillation characteristic of the mass structure 116.

The auxiliary mass member 114 includes a stop portion 120 integrally formed at its outer periphery so as to extend in the axially upward direction such that the stop portion 120 is opposed to the annular support portion 112 of the connecting metal member 83 in the axial direction with a predetermined axial spacing therebetween. The amount of axial displacement of the mass structure 116 toward the attaching member 76 is limited by abutting contact of the stop portion 120 with the annular support portion 112 through an annular rubber buffer 122 formed on the annular support portion 112.

Figure 5:
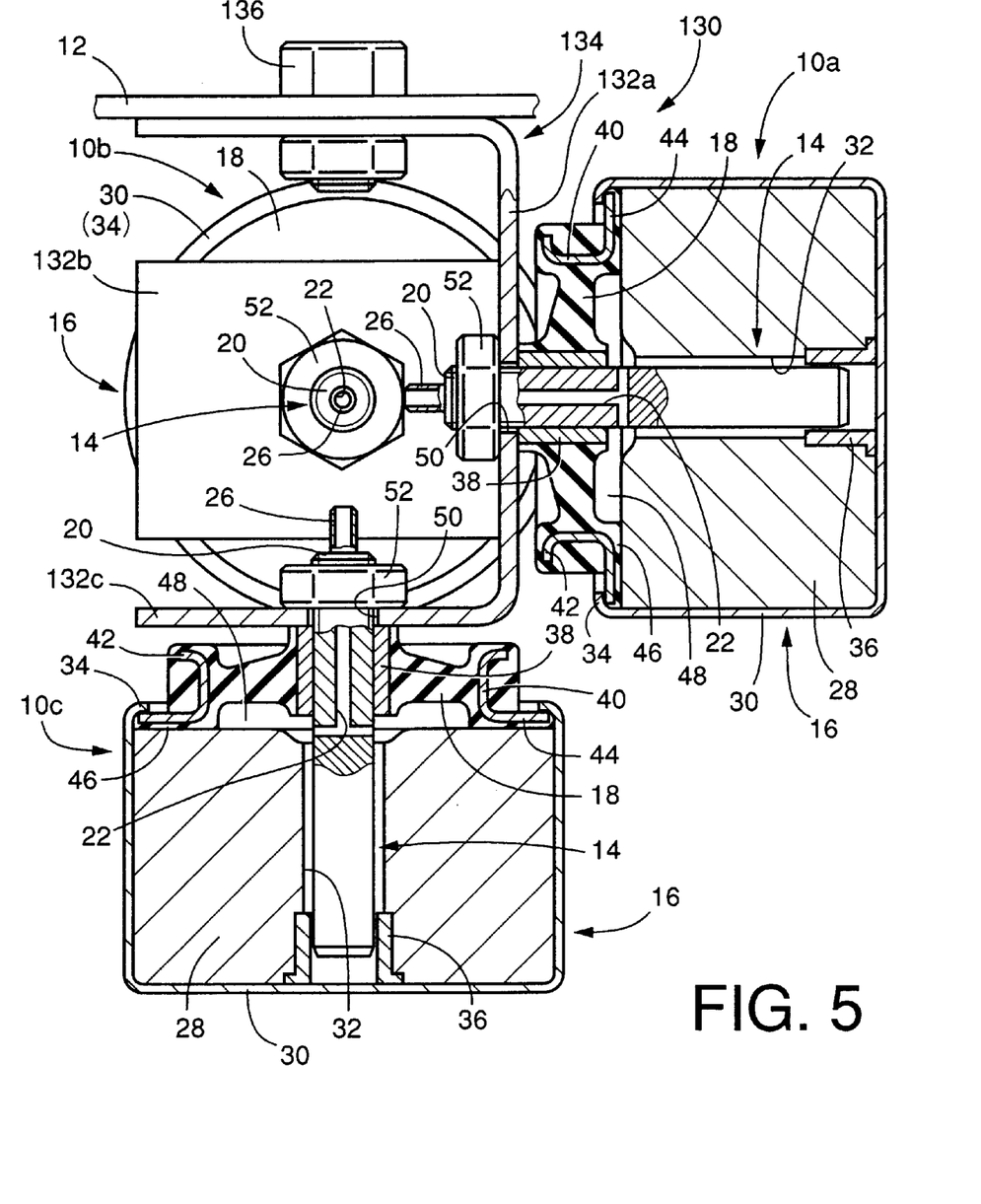
FIG. 5 is an elevational view in cross section of a vibration damper according to a fifth embodiment of the invention.

Referring net to FIG. 5, there will be described a vibration damping assembly 130 constructed according to a fifth embodiment of this invention, which uses three vibration dampers as shown in FIG. 1. The same reference signs as used in FIG. 1 will be used in FIG. 5 to identify the functionally corresponding elements, and redundant description of these elements will not be provided.

The vibration damping assembly 130 includes a bracket 134 having three attaching plate portions 132a, 132b, 132c which are perpendicular to each other. A first vibration damper 10a, a second vibration damper 10b and a third vibration damper 10c are attached to the respective attaching plate portions 132a, 132b and 132c, respectively. Each of these attaching plate portions 132a, 132b, 132c has the fixing hole 50, and each vibration damper 10 is attached to the attaching plate portion 132 with the nut 52 being screwed on the threaded upper end portion 20 of the attaching member 14 which extends through the fixing hole 50, in the same manner in the first embodiment of FIG. 1.

In the present vibration damping assembly 130, the directions of oscillation of the mass members 16 of the three vibration dampers 10a, 10b, 10c are perpendicular to each other, so that oscillating forces are applicable to the vibrating member 12 in the three mutually perpendicular directions.

The bracket 134 is fixed to the vibrating member 12 by bolts 136, so that the vibration damping assembly 130 is attached to the vibrating member 12. The nipple 26 of the attaching member 14 of each vibration damper 10a, 10b, 10c is connected to the air conduct 24 shown in FIG. 1, so that the reduced and atmospheric pressures are alternately applied to the air chambers 48 of the three vibration dampers 10a, 10b, 10c, by controlling the switch valves 56 for the three vibration dampers, independently of each other or in a coordinated fashion under the control of the controller 58.

Thus, the vibration damping assembly 130 constructed as described above is capable of applying oscillating forces to the vibrating member 12 in the three mutually perpendicular directions, to thereby effectively damp or control the vibrations of the vibrating member 12 in those three directions and in various other directions which are resultants of those three directions. Since the three vibration dampers 10a, 10b, 10c do not incorporate any actuators for oscillating the mass members 16, the size and weight of the vibration damping assembly 130 are reduced, and a vibration damping device including the assembly 130 capable of exhibiting a high damping effect in the three or more directions is available at a relatively reduced cost.

While the several presently preferred embodiments of this invention have been described above for illustrative purpose only, it is to be understood that the present invention is not limited to the details of these illustrated embodiments but may be embodied with various changes, modifications and improvements.

The illustrated embodiments are adapted such that the pressure in the air chamber 48, 100 is changed to oscillate the mass member 16, 82 or mass structure 116, for actively or positively damp the vibrations of the vibrating member 12. However, the vibration damper constructed according to the present invention may be used as a dynamic damper of a passive control type. In this case, the air chamber 48, 100 is kept at a predetermined negative or positive pressure so as to provide a desired spring constant by which the mass member 16, 82 or mass structure 116 is elastically supported by the attaching member 14, 76, so that the resonance frequency of the secondary vibration system including the mass member or structure is suitably adjusted depending upon the pressure in the air chamber. In other words, the constant pressure in the air chamber in the present vibration damper is determined depending upon the frequency of the input vibrations of the subject member to be damped, to exhibit an optimum damping effect.

Further, the volume of the air chamber 48, 100 and the rigidity or hardness of the walls defining the air chamber may be suitably determined so as to utilize a phenomenon of resonance based on compression of the air in the air chamber, which functions as a compression spring for effectively increase the oscillation force to be applied to the subject member.

In the fifth embodiment of FIG. 5, the three vibration dampers 10a, 10b, 10c are positioned relative to each other such that the mass members 16 of these three vibration dampers are displaced in the mutually perpendicular three directions. However, the three vibration dampers may be suitably determined, that is, the directions of displacement of the corresponding three mass members may be suitably determined. The vibration damping device may include two vibration dampers, or four or more vibration dampers.

The vibration damping device according to the present invention may include at least one vibration damper each adapted to operate as a dynamic damper of passive control type, and at least one vibration damper each adapted to operate as a damper of active control type.

It is to be understood that the present invention may be embodied with various other changes, modifications and improvements, which may occur to those skilled in the art, without departing from the spirit and scope of the present invention defined in the following claims:

What is claimed is:

1. A vibration damper system including at least one vibration damper each of which comprises:
   (a) an attaching member fixed to a subject member whose vibrations are damped by the vibration damper;
   (b) a mass member disposed such that said mass member is displaceable relative to said attaching member in a vibration input direction in which said vibrations are received;
   (c) an elastic connector secured to said attaching member and said mass member for elastically connecting said mass member to said attaching member, said mass member and said elastic connector at least partially defining a working chamber; and
   (d) means for defining a fluid passage connectable to an external fluid pressure source and communicating with said working chamber of said each vibration damper for changing a pressure of a fluid in said working chamber to thereby cause said mass member to be displaced relative to said attaching member in said vibration input direction.

2. A vibration damper according to claim 1, wherein said attaching member has said fluid passage.

3. A vibration damper according to claim 1, further comprising guiding means for guiding said mass member to be displaced relative to said attaching member in said vibration input direction, so as to prevent relative displacement of said mass member and said attaching member in a direction perpendicular to said vibration input direction.

4. A vibration damper according to claim 3, wherein one of said attaching member and said mass member has a guide hole extending in said vibration input direction, and said guiding means includes a guide rod which extends from the other of said attaching member and said mass member so as to extend in said vibration input direction and which engages said guide hole.

5. A vibration damper according to claim 4, wherein said attaching member includes said guide rod while said mass member has said guide hole, said attaching member further including an attaching portion at which said attaching member is fixed to said subject member, said elastic connector extending from said attaching portion of said attaching member in a direction substantially perpendicular to said vibration input direction, said mass member being spaced apart from said attaching portion of said attaching member in said vibration input direction and secured to a radially outer portion of said elastic connector such that said working chamber at least partially defined by said elastic connector and said mass member is located between said attaching portion and said mass member, said guide rod extending through said working chamber into said guide hole.

6. A vibration damper according to claim 1, wherein said fluid passage is connected at one of opposite ends thereof to an external air pressure source, and said working chamber consists of a single air chamber which is at least partially defined by said elastic connector and said mass member and which communicates with the other of said opposite ends of said fluid passage.

7. A vibration damper according to claim 1, wherein said fluid passage is connected at one of opposite ends thereof to an external air pressure source, said vibration damper further comprising a flexible diaphragm which fluid-tightly divides said working chamber in a liquid chamber filled with a non-compressible fluid on one side of said flexible diaphragm, and an air chamber on the other side of said flexible diaphragm, said air chamber communicating with the other of said opposite ends of said fluid passage.

8. A vibration damper according to claim 7, wherein said liquid chamber is defined by said flexible diaphragm, said elastic connector and said mass member, and an area of a surface of said flexible diaphragm which partially defines said air chamber is different from a total area of surfaces of said elastic connector and said mass member which partially define said liquid chamber.

9. A vibration damper according to claim 1, wherein said working chamber consists of two air chambers formed on opposite sides of said mass member which are opposed to each other in said vibration input direction, said two air chambers being connected to respective two mutually independent air passages connected to an external air pressure source so that air pressures in said two air chambers are periodically changed.

10. A vibration damper according to claim 9, wherein said two air passages are connected to said external air pressure source through respective two switch valves which are controlled to periodically change said air pressures in said two air chambers, in synchronization of a frequency of the vibrations of said subject member to be damped, and such that the air pressure in one of said two air chambers is lowered while the air pressure in the other of said two air chambers is raised.

11. A vibration damper according to claim 1, wherein said fluid passage is connected to an external air pressure source through a switch valve which is controlled to periodically changing an air pressure to be applied to said working chamber through said fluid passage, in synchronization with a frequency of the vibrations of said subject member to be damped.

12. A vibration damping device comprising: at least one vibration damper each comprising:
 (a) an attaching member fixed to a subject member whose vibrations are damped by the vibration damper;
 (b) a mass member disposed such that said mass member is displaceable relative to said attaching member in a vibration input direction in which said vibrations are received;
 (c) an elastic connector secured to said attaching member and said mass member, said mass member and said elastic connector at least partially defining a working chamber; and
 (d) a fluid passage communicating with said working chamber of each said vibration damper for changing a pressure of a fluid in said working chamber to thereby cause said mass member to be displaced relative to said attaching member in said vibration input direction;
 a reduced pressure source for generating a reduced pressure;
 a fluid conduit which is connected at one of opposite ends thereof to said reduced pressure source and at the other end to said fluid passage;
 a switch valve having an open position for communication of said fluid conduit with the atmosphere, and a closed position in which said fluid conduit is disconnected from the atmosphere; and
 a controller for controlling said switch valve such that said switch valve is alternately placed in said open and closed positions at a predetermined frequency.

13. A vibration damping device comprising: a plurality of vibration dampers each comprising:
 (a) an attaching member fixed to a subject member whose vibrations are damped by the vibration damper;
 (b) a mass member disposed such that said mass member is displaceable relative to said attaching member in a vibration input direction in which said vibrations are received;
 (c) an elastic connector secured to said attaching member and said mass member, said mass member and said elastic connector at least partially defining a working chamber; and
 (d) a fluid passage communicating with said working chamber of each said vibration damper for changing a pressure of a fluid in said working chamber to thereby cause said mass member to be displaced relative to said attaching member in said vibration input direction; and
 a bracket which supports said plurality of vibration dampers such that directions of displacement of the mass members of the vibration dampers relative to the attaching members are different from each other.

* * * * *